United States Patent [19]  
Rosenthal

[11] Patent Number: 4,943,438  
[45] Date of Patent: Jul. 24, 1990

[54] BREAD CRUMB COATING COMPOSITION AND PROCESS FOR IMPARTING FRIED-LIKE TEXTURE AND FLAVOR TO FOOD PRODUCTS

[75] Inventor: Sallie W. Rosenthal, Manchester, Mo.

[73] Assignee: ConAgra, Inc., Omaha, Nebr.

[21] Appl. No.: 314,224

[22] Filed: Feb. 21, 1989

Related U.S. Application Data

[63] Continuation of Ser. No. 882,236, Jul. 7, 1986, abandoned.

[51] Int. Cl.$^5$ .................................................. A23L 1/00
[52] U.S. Cl. ...................................... 426/92; 426/296; 426/303; 426/555; 426/652
[58] Field of Search ............... 426/549, 555, 652, 302, 426/303, 89, 92, 94, 96, 291, 289, 292, 295, 296, 99, 128

[56] References Cited

U.S. PATENT DOCUMENTS

| | | |
|---|---|---|
| 2,910,370 | 10/1959 | Rogers et al. |
| 3,052,545 | 9/1962 | Ducharme et al. |
| 3,078,172 | 2/1963 | Libby .................................. 426/295 |
| 3,208,851 | 9/1965 | Antinori et al. |
| 3,486,904 | 12/1969 | Ziegler. |
| 3,586,512 | 6/1971 | Mancuso et al. |
| 3,843,827 | 2/1972 | Lee et al. ............................. 426/296 |
| 3,852,501 | 12/1974 | Fazzina et al. |
| 3,870,806 | 3/1975 | Capossela ........................... 426/273 |
| 3,947,241 | 3/1976 | Caridis et al. |
| 3,952,110 | 4/1976 | Knight et al. |
| 4,068,009 | 1/1978 | Respoli et al. ..................... 426/296 |
| 4,167,585 | 9/1979 | Caredis et al. .................... 426/510 |
| 4,199,603 | 4/1980 | Sortwell, III. |
| 4,208,442 | 6/1980 | Evans et al. |
| 4,218,485 | 8/1980 | Lee et al. ........................... 426/555 |
| 4,260,637 | 4/1981 | Rispoli et al. |
| 4,330,566 | 5/1982 | Meyer et al. |
| 4,344,975 | 8/1982 | Seiler .................................. 426/555 |
| 4,364,961 | 12/1982 | Darley ............................... 426/549 |
| 4,367,242 | 1/1983 | Jarvis et al. |
| 4,423,078 | 12/1983 | Darley et al. ...................... 426/549 |
| 4,496,601 | 1/1985 | Respoli et al. .................... 426/555 |
| 4,511,583 | 4/1985 | Olson et al. |
| 4,518,618 | 5/1985 | Hsia et al. |
| 4,518,620 | 5/1985 | Monagle ............................ 426/291 |
| 4,529,607 | 7/1985 | Lenchin et al. |
| 4,568,550 | 2/1986 | Fulger ................................ 426/551 |
| 4,609,557 | 9/1986 | Mao ................................... 426/549 |
| 4,609,558 | 9/1986 | Geacone ............................ 426/549 |
| 4,640,837 | 2/1987 | Coleman et al. .................. 426/96 |
| 4,675,197 | 6/1987 | Banner .............................. 426/555 |
| 4,755,392 | 7/1988 | Banner .............................. 426/555 |

Primary Examiner—Carolyn Paden  
Attorney, Agent, or Firm—Willian Brinks Olds Hofer Gilson & Lione

[57] ABSTRACT

A breading crumb mixture and process for coating food products are disclosed. The crumb mixture and process impart a fried-like texture and flavor to the resultant food products. The breading crumb mixture comprises extruded flour dough crumbs, dielectrically baked crumbs and beaded shortening. The process of the invention includes the steps of coating a food product with a binding agent, breading the coated product with the breading crumb mixture, baking the breaded product in a humidified oven, applying edible oil in atomized form to the surface of the baked product, and exposing the baked product surface to high temperature heating for the purpose of browning and crisping.

15 Claims, No Drawings

BREAD CRUMB COATING COMPOSITION AND PROCESS FOR IMPARTING FRIED-LIKE TEXTURE AND FLAVOR TO FOOD PRODUCTS

This application is a continuation of application Ser. No. 06/882,236, filed July 7, 1986, now abandoned.

BACKGROUND OF THE INVENTION

Food coatings for meats, seafood, vegetables and the like have been used for many years In home preparation, the food is typically first coated with a batter comprised essentially of flour, milk, eggs and seasoning, and the resulting product is then typically coated with bread or cereal crumbs which have been either dried or toasted. The coated food is then cooked, usually fried, and served for consumption.

Coatings are typically used in the food industry to form a seal against moisture loss during frozen storage and consumer reheating. During reheating, coatings can absorb the natural juices of a food product while maintaining a desirable, crisp outer surface and thereby conserve and retain the natural flavor and nutritive value of the food. The texture and flavoring of the coating can be adjusted to meet or create consumer demand. Coatings can also give a more pleasing appearance, both in the food product's frozen, storage form and also when it is reheated and served by the consumer.

Consumers typically enjoy food with a fried-like taste and texture. However, consumers also typically prefer the ease and simplicity of conventional baking or microwave cooking as an alternative to frying. Consequently, the food industry has responded by developing different methods and compositions for providing products which, upon conventional oven reheating, result in food with a fried-like texture and flavor. Breading crumbs are often used in the food industry to enhance the fried-like texture.

Breading crumbs are typically derived from bread or cereal which have been either dried or toasted. A binding agent is often used in applying the crumbs to the food. Binding agents typically comprise a batter (with or without a preliminary predust) or a liquid wash made from a water solution containing a food grade adhesive. Functional food grade adhesives comprise starch adhesives (modified, unmodified, or pregelatinized), naturally occurring protein adhesives (such as egg albumen or vital wheat gluten), and dry gums (such as hydroxypropyl cellulose (HMC), carboxymethyl cellulose (CMC), micro-crystalline cellulose, sodium alginate, or xanthan gum). These adhesives may be incorporated in a dry predust applied to a food product which is thereafter wetted, or may be mixed in a wash solution or batter applied to the food product.

A use of certain functional food grade adhesives in applying bread crumbs to food products without the use of a batter is discussed in Rispoli, U.S. Pat. No. 4,260,637. Binding agents may also sometimes comprise one or more of the following: shortening, salts, dyes and pH buffers. When the food industry uses a batter as a binding agent, a batter mix is typically first prepared, comprising flour, non-fat dry milk, milk derivatives, egg products, flavoring agents, and coloring agents. The batter is typically prepared by adding water to the batter mix.

Some coatings designed to provide a friedlike texture have been developed for microwave cooking. A number of previously known coating compositions, for both conventional and microwave cooking, are disclosed in the following patents: Rispoli et al., U.S. Pat. No. 4,496,601; Lee et al., U.S. Pat. No. 4,218,485; Evans et al., U.S. Pat. No. 4,208,442; Sortwell, U.S. Pat. No. 4,199,603; Mancuso, U.S. Pat. No. 3,586,512; Meyer et al., U.S. Pat. No. 4,330,566; and Fazzina et al., U.S. Pat. No. 3,852,501. These coatings and processes have had varying degrees of success.

Microwave cooking of coated foods typically fails to produce the "mouth-feel", taste, or texture resembling fried foods. In microwave cooking, the heat energy is released internally within the food. The surface, unlike conventional cooking methods, remains at a relatively even temperature with the interior; consequently, the high surface temperatures necessary to achieve browning, dehydration, and crisping in the coating are typically not achieved. In an effort to overcome these problems, some appliance manufacturers have resorted to including conventional heating elements within microwave chambers. Food coating merchandisers sometimes include brown coloring components in their coating mixes, to artificially produce the desired browned appearance of the food surface. An auxiliary browning element adds to the expense of the microwave oven, increases its complexity and may or may not produce the desired results. In the case of adding coloring components to the food coatings, somewhat better color appearance may be achieved; however, the desired surface crispness and dehydration is typically not obtained.

Problems with previous known coating processes include the ability of the coating to adhere to the product surface. Texture, color and mouthfeel characteristics of the coated foods could also be made more organoleptically desirable. Some coatings lose their crispness by absorbing condensation during storage temperature fluctuations.

Finally, although customers desire fried-like flavor and texture, customers typically view fried foods as less nutritionally desirable than foods which are baked. Indeed, fried foods typically absorb oil as moisture is fried out of the foods. This increases the amount of fat, cholesterol, and calories in the food.

Achieving fried-like flavor and texture for food products, particularly chicken, consistent with consumer demands but without the disadvantages of frying is an object of this invention.

SUMMARY OF THE INVENTION

The present invention relates to a method of preparing a food product which comprises coating an initial food product with a binding agent, breading the coated product with breading crumbs comprising extruded flour dough crumbs, dielectrically baked flour dough crumbs or mixtures thereof, baking the breaded product in a humidified oven, applying atomized oil to the surface of the baked product and exposing the baked product surface to high temperature heating, for the purpose of browning and crisping the surface.

This invention also relates to an improved breading crumb mixture which produces an improved fried-like taste, texture and appearance without the disadvantages of frying, comprising dielectrically baked crumbs, extruded flour dough crumbs; shortening, and optional spices and flavoring.

Another aspect of the invention relates to food products coated with the improved coating composition.

DETAILED DESCRIPTION OF THE PREFERRED EMBODIMENT

The preferred embodiment of the invention is used to coat chicken; however other food products which the present invention may be applied to include fish, seafood, red meat, cheese and vegetables.

In the preferred embodiment, raw chicken is first skinned and cut into parts. The chicken parts are then injected with a solution comprising water, phosphate and salt. The solution is used both as a preservative (antioxidant) and as a means to enhance the natural moisture content of chicken. The preferred composition of this solution is 90.6% water, 3.8% phosphate and 5.6% salt (all percentages disclosed herein are by weight unless designated otherwise). However, the following ranges for this solution are also acceptable:
60%–100% water;
0%–10% phosphate;
0%–16% vegetable oil;
0%–10% salt;
0%–2% carboxymethyl cellulose (CMC); and
0%–2% hydrolyzed vegetable protein (HVP).

The amount of solution injected on a weight basis is preferably 10–15% of the weight of the raw chicken; however a range of 5%–35% is also acceptable.

The injected raw chicken is then predusted with a composition preferably of 60% wheat flour, 20% corn flour, and 10% spices, salt, sugar and flavoring. However, the following ranges are also acceptable:
40–100% wheat flour
0%–40% corn flour
0%–20% spices, salt, sugar and flavoring.

One preferred blend of spices, salt, sugar and flavoring is Natural Chicken Flavor #106198, supplied by Fries and Fries, Cincinnati, Ohio.

Functional food grade adhesives can also be added to the predust; such adhesives comprise dry gums (such as hydroxypropyl cellulose (HMC), carboxymethyl cellulose (CMC), microcrystallinzcellulose, sodium alginate, and xanthan gum), starch adhesives (modified, unmodified or pregelatinized) and naturally occurring protein adhesives (such as egg albumen or vital wheat gluten). This list is not exhaustive and any functional food grade adhesive may be added to the predust. Predusting aids in flavor and texture development of the product.

In the preferred embodiment, a batter is applied to the predusted chicken. The preferred composition of the batter is 83% water, 16.5% wheat flour and 0.5% carboxymethyl cellulose (CMC). However, the following ranges are also acceptable:
74%–92% water
8%–24% wheat flour
0%–2% CMC.

As in the predust, the batter may also include any functional food grade adhesives (examples of which are cited in the previous paragraph) or spices.

A breading crumb mixture is next applied to the battered product. In the preferred embodiment, about 40–60% by weight of the breading crumbs in the mixture are derived from extruded dough. In the preferred composition of the invention, the raw dough for the extruded crumb comprises 4% rice flour, 4% corn flour, 4% wheat flour, 4% malted barley extract, and 84% water. However, the following ranges are also acceptable.
2%–6% rice flour
2%–6% corn flour
2%–6% wheat flour
2%–6% malted barley extract
76%–92% water.

During extrusion, the water content drops to a low level, leaving a crumb comprising, in the preferred embodiment, approximately equal amounts of rice flour, corn flour, wheat flour and malted barley extract. A preferred extruded crumb developed in conjuction with the present invention is Martha White Bread Crumbs #6804, which may be purchased from the Martha White division of Beatrice Grocery Products, Inc., Nashville, Tennessee.

Several optional ingredients may be included in the dough, and thus enhance color and flavor qualities of the crumb, such as caramel color, oleoresin paprika, tumeric, spices, salt and sugar. The rice flour and corn flour have been found to extend frozen shelf life and increase crispiness of the final product The wheat and malted barley have been found to contribute to the flavoring of the final product. The preferred extruded dough crumb has been found to be less hygroscopic than typical bread crumbs. This diminished hygroscopic nature of the crumbs causes them to absorb less moisture during transportation and storage temperature fluctuations. Furthermore, this type of crumb is less fragile than typical breading crumbs and enhances the texture characteristics and frozen storage stability of the coating. Crumb size may be either coarse (Japanese size) or finer (American size) granulation.

In the preferred embodiment, the balance of the breading crumbs are dielectrically baked crumbs, also known as Japanese bread crumbs, comprising primarily wheat flour, with minimal amounts of corn flour, and malted barley extract. A suitable dielectrically baked crumb is Japanese Bread Crumbs #8002 supplied by Griffith Laboratories, Breading Division, Scarborough, Ontario, Mi13J8. Suitable dielectrically baked Japanese bread crumbs are also available from Newly Weds Foods, Chicago, Illinois, and Modern Maid Food Products, Inc., Jamaica, N.Y. Japanese bread crumbs are generally known in the food industry and are mentioned in Evans, U.S. Pat. No. 4,208,442, col. 2; Rispoli, U.S. Pat. No. 4,260,637, col. 2; Sortwell, U.S. Pat. No. 4,199,603, col. 5; Olson, U.S. Pat. No. 4,511,583, col. 3; and Monagle, U.S. Pat. No. 4,518,620, col. 4.

The Japanese bread crumbs contribute to the coating's ultimate texture, flavor and appearance. The combination of extruded and dielectrically baked crumbs in the preferred embodiment is found to provide functional properties to the crumb coating which are important for products having frozen shelf life considerations. In applications where the products are not frozen, other crumb combinations may be acceptable in the process of the present invention. Also, in such other applications, additional or substitute cereal flavors may be used in making the crumbs.

In the preferred embodiment of the process and the breading crumb mixture of the present invention, the dielectrically baked crumbs and extruded crumbs are enrobed with a thin coating of vegetable oil. The amount of oil used is in a range of 1–5%, preferably 2%, of the total crumb mixture weight. This addition of vegetable oil improves the ultimate mouth feel of the coating by improving its texture.

In the preferred embodiment, beaded shortening is also added to the breading crumb mixture at 5–10%, preferably 7.5%, of the total crumb and shortening weight. The use of beaded shortening makes the shortening more manageable in this particular application. Without using beaded shortening, the shortening would adhere to container surfaces and breading equipment during preparation, preventing free flow and adequate coverage of the product. In beaded form, the shortening does not have this adhesive quality; consequently, consistency and uniformity of shortening in the bread crumb mixture are more easily achieved. A suitable beaded shortening is available from Durkee, SCM Ind. Foods, Chicago, Ill. under the name of Beaded Shortening. The shortening is added to improve the texture and taste of the coating. The beaded shortening is mixed with the enrobed, extruded and dielectrically baked crumbs. The resulting breading crumb mixture is then applied to the battered food. In the preferred embodiment, the amount of breading crumb mixture used is between 4% and 14% of the weight of the raw chicken, preferably about 9%. The weight of the combined batter and product is about 12% of the weight of the raw predusted chicken; however, a range of 5%-19% is also acceptable.

In practicing the process of the invention for chicken, the predusted, battered and breaded chicken food product is baked in a humidified oven at 350° F. dry bulb temperature and 165° F. wet bulb temperature. Preferably, these temperatures should be controlled to ±5° F. to obtain required moisture levels for bone-in chicken products while attaining a crisp crumb coating. The wet bulb temperature may be adjusted by the injection of live steam. For other food products, different temperatures (both wet and dry bulb) may be preferred.

Humidified baking may be accomplished through the use of a Multi-Purpose Oven (MPO) manufactured by Heat and Control Inc., 225 Shaw Road, South San Francisco, Calif. 94080. This oven is disclosed in U.S. Pat. No. 4,167,585. Alternative ovens which may also be used in practicing the process of the present invention include Counter Flow Oven (CFO) made by Stein Assoc. Inc., Sanduskey, Ohio; Jetzone Oven by Wolverine Corp., Methuen, Mass.; and Thermal Jet Oven by Thermal Jet Engineering, Fullerton, Calif. Depending on the chicken part and size (profile), humidified bake times vary from 16.3 minutes for half-breasts from a 34-ounce chicken to 21.0 minutes for thighs from a 38-ounce chicken.

In conducting the humidified baking in the preferred embodiment, important considerations include the ability to heat by convection (such as with air currents), and the ability to continuously pass chicken through the humidified baking process such as through the use of a surface-lubricated conveyor belt. In the preferred embodiment, the conveyor belt is continuously passed through a dip tank containing water, vegetable oil or a mixture thereof and a lubricant such as lecithin.

The humidified baking is continued until the coated food products attain a desired internal temperature. When the food product comprises chicken, the minimum internal temperature is 160° F. for white meat and 180° F. for dark meat. These internal temperatures are in conformity with the current USDA specification for precooked chicken.

After the chicken has been heated in the humidified oven, the preferred process of the present invention is further practiced by spraying a fine coating of atomized vegetable oil (any hydrogenated or stabilized edible oil may be used) onto the food product while the food product is still hot. This oil misting may be done before and/or after the humidified bake. In the preferred embodiment, the oil spray is done after the humidified bake by use of atomizing nozzles mounted over the product conveyor belt. An automatic eye sensing device or switch is activated by the presence of product as the product enters and exits the misting area. The oil is applied at a rate of about 2-10% of the raw food product weight. This oil further develops the ultimate flavor and texture of the food product.

The oil misted and baked product is then subjected to surface browning. Surface browning in the preferred embodiment is done in a chamber which has air knives with controllable air velocity creating hot air currents and either gas jets or infrared heating elements producing temperatures of 700° F.-900° F. at the product surface. The surface browning is preferably done at atmospheric pressure, and the hot air streams are preferably introduced at an initial pressure of 20-25 psig. Surface browning further develops flavor and color of the ultimate product. In practicing the preferred embodiment of the invention, approximately three minutes is required in the browning unit for most sizes of chicken parts.

Important operating parameters of the surface browner include (1) its ability to achieve extreme temperatures (700° F.-900° F.) at the product surface via gas jets or an infrared heating element (this, in conjunction with the misted oil, contributes to the surface frying effect); (2) adjustable air knives which direct hot air flow over the product surface, creating a drying and crisping effect; and (3) the continuous conveying nature of the unit making it compatible with the other elements of a continuous production system. A suitable infrared browning unit is the MPO browning attachment optionally supplied with the MPO oven from Heat Of Control Inc. of South San Francisco, Calif. Heat & Control Inc. also produces a suitable stand-alone browning unit using gas jets.

The surface fried product may be stored frozen and later sold to consumers. Consumers who purchase this product are able to heat the product by conventional oven baking or microwave cooking. If chicken is used as the food product subject to the process of the present invention, the final chicken product has a friedlike texture and flavor.

The foregoing description has been given for illustration purposes only. A wide range of changes and modifications can be made to the preferred embodiment described above. It should therefore be understood that it is the following claims, including all equivalents, which are intended to define the scope of this invention.

I claim:

1. A method of preparing food products which produces in said food products, when reheated by microwave or conventional baking, a flavor, texture, and appearance produced by frying said food products, comprising the steps of:

(a) coating an initial food product with a binding agent;

(b) breading the coated product with a breading crumb mixture comprising extruded flour dough breading crumbs, said flour dough breading crumbs being made from dough comprising 2-6% rice flour, 2-6% corn flour, 2-6% wheat flour and 2-6% malted barley extract, and said crumbs being formed by an extrusion process which removes most of the moisture from the dough;

(c) baking the breaded product in a humidified oven;

(d) applying edible oil in atomized form to the surface of the baked product; and then (e) exposing the baked product surface to high temperature heating, said oil and heating being supplied in amounts sufficient to provide a brown, crisp and fried-like appearance to the breaded product.

2. The method of claim 1 wherein the breading crumb mixture further comprises beaded shortening.

3. The method of claim 1 wherein the initial food product is predusted with a mixture comprising flour and flavoring prior to coating with a binding agent in step (a).

4. The method of claim 1 wherein the food product comprises a skinless raw chicken food product.

5. The method of claim 4 wherein the baking is conducted in a humidified oven at about 350° F. dry bulb temperature and 165° F. wet bulb temperature until the chicken reaches an internal temperature of 160° F. to 180° F.

6. The method of claim 1 wherein the binding agent comprises a batter.

7. The method of claim 1 wherein the extruded flour dough breading crumbs are made from dough comprising approximately equal amounts of corn flour, wheat flour, rice flour and malted barley extract.

8. The method of claim 1 wherein the high temperature heating provides temperatures of 700° F. to 900° F. at the product surface.

9. The method of claim 1 wherein the breading crumb mixture further comprises dielectrically baked crumbs.

10. A breading crumb mixture for food products which produces a fried-like texture and flavor in said food products upon reheating by conventional or microwave baking said food products after they have been baked in a humidified oven, misted with an edible oil, exposed to high temperature surface heating and frozen, the mixture comprising:

(a) dielectrically baked crumbs;

(b) extruded flour dough crumbs, said crumbs resulting from an extrusion of a dough comprising:
  (i) 2–6% rice flour
  (ii) 2–6% corn flour
  (iii) 2–6% wheat flour
  (iv) 2–6% malted barley extract and
  (v) 76–92% water
  through an extruder which removes most of the moisture from the dough, leaving a crumb;

(c) shortening and (d) optional spices and flavoring.

11. The breading crumb mixture of claim 10 wherein the extruded dough crumb comprises approximately equal amounts of rice flour, corn flour, wheat flour and malted barley extract.

12. The breading crumb mixture of claim 9 wherein the crumbs are enrobed with vegetable oil at a range of 1–5% of the crumb weight, and wherein the crumb mixture comprises:

(a) 40–55% extruded flour dough crumbs, (b) 40–55% dielectrically baked crumbs and (c) 5–10% beaded shortening.

13. A coated, cooked frozen food product which, when reheated by microwave or conventional baking, has a flavor, texture and appearance of a fried food product, comprising a food product coated, before cooking, with (a) a binding agent and (b) a breading comprising:
  (i) 40–55% extruded flour dough crumbs made from a dough comprising 2–6% rice flour, 2–6% corn flour, 2–6% wheat flour, 2–6% malted barley extract and 76–92% water;
  (ii) 40–55% dielectrically baked crumbs and
  (iii) 5–10% shortening.

14. The coated food product of claim 13 wherein the food product comprises chicken.

15. The coated food product of claim 13 wherein the extruded flour dough bread crumbs comprise approximately equal amounts of corn flour, wheat flour, rice flour and malted barley extract.

* * * * *

UNITED STATES PATENT AND TRADEMARK OFFICE
CERTIFICATE OF CORRECTION

PATENT NO. : 4,943,438

DATED : July 24, 1990

INVENTOR(S) : Sallie W. Rosenthal

It is certified that error appears in the above-identified patent and that said Letters Patent is hereby corrected as shown below:

Title Page:

IN THE REFERENCES CITED

On the cover page after "4,068,009  1/1978", please delete "Respoli et al. ........ 426/296" and substitute therefor --Rispoli et al. ....... 426/291--.

On the cover page after "4,167,585  9/1979" please delete "Caredis et al. ....... 426/510" and substitute therefor --Caridis et al. ....... 426/233--.

On the cover page after "4,496,601  1/1985" please delete "Respoli" and substitute therefor --Rispoli--.

In column 1, line 11, after "years" please insert --.--.

In column 1, line 66, please delete "friedlike" and substitute therefor --fried-like--.

In column 2, line 33, please delete "mouthfeel" and substitute therefor --mouth-feel--.

UNITED STATES PATENT AND TRADEMARK OFFICE
CERTIFICATE OF CORRECTION

PATENT NO. : 4,943,438

DATED : July 24, 1990

INVENTOR(S) : Sallie W. Rosenthal

It is certified that error appears in the above-identified patent and that said Letters Patent is hereby corrected as shown below:

In column 3, line 41, please delete "microcrystallinzcellulose" and substitute therefor --microcrystallinecellulose--.

In column 4, line 19, after "product" please insert --.--.

In column 5, line 11, after "Ill." please insert --,--.

In column 5, line 20, before "product" please insert --predust--.

In column 6, line 4, after "sensing" please delete ",".

In column 6, line 44, please delete "friedlike" and substitute therefor --fried-like--.

column 8 claim 10, line 18, after "shortening" please insert --;--.

UNITED STATES PATENT AND TRADEMARK OFFICE
CERTIFICATE OF CORRECTION

PATENT NO. : 4,943,438

DATED : July 24, 1990

INVENTOR(S) : Sallie W. Rosenthal

It is certified that error appears in the above-identified patent and that said Letters Patent is hereby corrected as shown below:

column 8 In claim 13, line 1, after "cooked" please insert --,--; and in line 12, after "crumbs" please insert --;--.

Signed and Sealed this

Eighth Day of December, 1992

Attest:

DOUGLAS B. COMER

*Attesting Officer*   Acting Commissioner of Patents and Trademarks